United States Patent [19]

Scarso

[11] Patent Number: 4,997,876
[45] Date of Patent: * Mar. 5, 1991

[54] FLAME-RETARDING COMPOSITION FOR POLYMERS AND SELF-EXTINGUISHING POLYMERIC PRODUCTS SO OBTAINED

[75] Inventor: Luciano Scarso, Milan, Italy

[73] Assignee: V.A.M.P. S.r.L., Milan, Italy

[*] Notice: The portion of the term of this patent subsequent to Feb. 23, 2005 has been disclaimed.

[21] Appl. No.: 302,687

[22] PCT Filed: Jun. 30, 1988

[86] PCT No.: PCT/EP88/00571
§ 371 Date: Jan. 18, 1989
§ 102(e) Date: Jan. 18, 1989

[87] PCT Pub. No.: WO89/01011
PCT Pub. Date: Feb. 9, 1989

[30] Foreign Application Priority Data

Aug. 4, 1987 [IT] Italy ................................ 21690 A/87

[51] Int. Cl.$^5$ ............................................... C08K 3/32
[52] U.S. Cl. ..................................... 524/706; 523/205; 523/451; 523/506; 524/416; 524/868
[58] Field of Search ..................... 523/205, 451, 506; 524/416, 868, 706

[56] References Cited

U.S. PATENT DOCUMENTS

| | | | |
|---|---|---|---|
| 4,198,493 | 4/1980 | Marciandi | 524/416 |
| 4,727,102 | 2/1988 | Scarso | 523/205 |
| 4,772,642 | 9/1988 | Staendeke | 523/205 |

FOREIGN PATENT DOCUMENTS 0204027B 12/1988 European Pat. Off. .

Primary Examiner—Lewis T. Jacobs
Attorney, Agent, or Firm—Collard, Roe & Galgano

[57] ABSTRACT

Flame-retarding composition for rendering self-extinguishing polymers, copolymers, mixtures of polymers and various polymeric materials, comprising a polymer, a copolymer, or a mixture of polymers of hydroxyalkyl-derivatives of isocyanuric acid and ammonium polyphosphate, and so-obtained self-extinguishing polymers and polymeric materials.

7 Claims, No Drawings

FLAME-RETARDING COMPOSITION FOR POLYMERS AND SELF-EXTINGUISHING POLYMERIC PRODUCTS SO OBTAINED

DESCRIPTION

The present invention is concerned with a "flame-proofing" or "flame-retarding" composition for polymers, copolymers and blends of such polymers as polyolefins, polystyrenes, polyurethanes, etc., as well as thermosetting epoxy resins, polyesters, and the like.

An object of the invention are also the polymers, copolymers, polymeric mixtures and the thermosetting resins, as well as miscellaneous polymeric materials, such as paints, fabrics and the like, rendered self-extinguishing by means of said flame-retarding composition.

It is known that a generic polymeric material is made "self-extinguishing" or "flame-proof" or "flame-resistant" by means of the addition of particular "flame-proofing" or "flame-retarding" agents, which are precisely capable of endowing the polymeric substance with the required characteristics of self-extinguishment. Such flame-proofing agents are constituted by halogenated, usually brominated, organic substances, metal compounds (in particular oxides, such as, e.g., antimony trioxide), phosphorus and its derivatives (such as, e.g., red phosphorus, ammonium polyphosphate, organic phosphoric esters), miscellaneous nitrogen-containing compounds (such as, e.g., urea, dicyandiamide, melamine), and still others. It is known that in some cases, in order to reach the desired characteristics of self-extinguishment in a polymer, even two or more different flame-proofing compounds are used in association with each other, both in order to exploit, in combination, specific flame-proofing characteristics and/or "functions", and to accomplish determined particular "synergistic" or "combined" effects, and to avoid adding excessively high amounts on an individual flame-proofing agent, necessary to reach the desired level of self-extinguishment in the polymer, but which would involve an alteration or degradation of the same polymer, due to the typical characteristics of the flame-proofing agent used.

It is well known indeed that when a self-extinguishing polymeric material has to be accomplished by incorporating into it one or more flame-retarding agents, the amounts of said agents in the above-said material have to be limited as extensively as possible, in order not to appreciably alter the chemical-physical and mechanical characteristics of the same material.

It is furthermore known that a loss (escape) by extraction and/or dissolving of the flame-retarding agents added to said materials, and the "ageing" of said agents—in terms of a loss of flame-retarding power of the same agents as a function of time and/or particular chemical and/or physical factors of the surrounding environment—occurs.

Flame-retarding compositions of known type are those constituted by a hydroxyalkyl-derivative of isocyanuric acid, viz., a nitrogen-containing cyclic product, in particular tris-(2-hydroxyethyl)-isocyanurate, in association with other two components, viz., with a phosphorus-based product, such as ammonium polyphosphate, and another nitrogen-containing product, such as melamine, cyanuric acid, melamine salts, e.g., melamine cyanurate (European patent application No. 0204027 and U.S. Pat. No. 4,198,493). It can be seen that these are three-component flame-retarding compositions, based on phosphorus and nitrogen, suitable for being used in order to render self-extinguishing the polyolefinic and/or polystyrenic polymers.

A purpose of the present invention is to provide a flame-retarding composition constituted by two components only, which can be used in the necessary amounts and mutual ratios to reach the desired degree of self-extinguishment in the polymer, without phenomena occurring of alteration and/or degradation of the chemical-physical and mechanical characteristics of the polymer, due to the presence of several flame-proofing agents.

Another purpose of the present invention is to provide a flame-retarding composition for polymers, which is stable over time, and to the external environmental agents, and which, therefore, does not give rise to losses due to the extraction and/or dissolving of the flame-proofing agents introduced in the polymer.

Still another purpose of the present invention is to provide a flame-retarding composition for general use, i.e., which can be advantageously used for a very wide range of polymeric materials, comprising the polyolefins, the styrenic polymers, the polyurethanes, the epoxy resins, the unsaturated polyesters, and the like.

These and still further purposes and related advantages, which will be evidenced by the following disclosure, are advantageously achieved by a flame-retarding composition for polymers, copolymers, mixed polymers and therewith obtained polymeric materials, which composition, according to the present invention, comprises the following components:

(A) a polymer, a copolymer or a mixture of polymers and/or copolymers of the hydroxyalkyl-derivatives of isocyanuric acid, having the formula

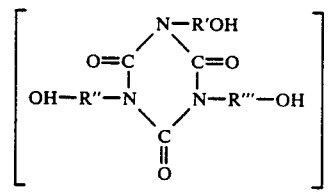

wherein R', R" and R'" are alkyl radicals, equal to, or different from, each other, containing from 1 to 6 carbon atoms.

(B) ammonium polyphosphate, having the general formula $$(NH_4)_{n+2}P_nO_{3n+1}$$

wherein n is a number higher than 20. We were able to observe, in fact, that the hydroxyalkyl-derivatives of isocyanuric acid, when in polymerized form, perform their flame-proofing action in association with phosphorus-containing agents, without causing substantial alterations in the chemical-physical and/or mechanical characteristics of the polymer in which they are incorporated, and without the occurrence of dissolving, migration, extraction phenomena, and the like. Therefore, with the other conditions being the same, the use of the isocyanuric acid hydroxyalkyl-derivative in the polymerized form, according to the present invention, makes it surprisingly possible the desired levels of self-extinguishment to be reached in the polymers in which said polymer derivative is introduced in association with phosphorus derivatives, with no need to resort to the association of other nitrogenous products such as e.g., urea, dicyandiamide, melamine and/or salts thereof, such as, e.g., the cyanurate, and so forth, whose use is known to cause considerable and serious drawbacks to the detriment of the chemical, physical and mechanical characteristics of the polymeric material endowed with the self-extinguishing characteristics.

Furthermore, and still more surprisingly, we were able to observe that the flame-retarding composition according to the present invention is suitable for general use, and can be advantageously used for polyolefinic polymers, copolymers and mixed polymers (such as polyethylene, polypropylene, ethylenepropylene rubbers, etc.), for styrenic polymers (such as polystyrene, impact-resistant polystyrene, SBS, ABS resins, etc.), for polyurethanes, for thermosetting resins, such as epoxy resins and unsaturated polyesters. The composition according to the invention can be furthermore used for the purpose of rendering self-extinguishing various polymer-based materials, such as, e.g., the paints, the fabrics, the sizes for r fabrics, the adhesives, the latexes for carpets, and the like.

Preferably, as the (A) component of the composition according to the invention, the polymer of tris-(2-hydroxyethyl)-isocyanurate is used, which is polymerized according to known processes, e.g., by heating the monomer in the presence of a suitable condensation-etherification catalyst, according to as reported in U.S. Pat. No. 3,293,224.

According to the present invention, the (B) component, i.e., the ammonium polyphosphate, is preferably used in the form of particles microencapsulated (according to known processes) in a water-repellent synthetic resin, or the like, in particular when the composition according to the present invention is destined to render self-extinguishing polymeric materials for electrical applications, for uses requiring low water absorption by the same materials, and when a high resistance to water-extraction is required.

Still according to the present invention, the (B) component can be mixed with the monomer of the hydroxyalkyl-derivative of isocyanuric acid before and/or while the polymerization of said monomer is carried out, e.g. by heating a previously prepared mixture of hydroxyalkyl-derivative of isocyanuric acid and ammonium polyphosphate in the presence of the condensation-etherification catalyst, so obtaining a flame-retarding composition (A+B) in which the (B) component is intimately and uniformly incorporated into the (A) component. Consequently, the distribution of the flame retardant composition into the polymer to be rendered self-exstinguishing results yet easier and more effective.

It has been seen that, when the ammonium polyphosphate is so incorporated into the (A) component, the flame-retarding composition can be advantageously used for rendering self-extinguishing polymeric materials for electrical applications and in general when low water absorption and/or high resistance to water-extraction is required, even without the use of the above mentioned microencapsulated form for said ammonium polyphosphate. Furthermore, it has also been surprisingly seen that a $(NH_4)_{n+2}P_nO_{3n+1}$ can be advantageously used in which n is a number lower than 20, and even equal to 1.

The amounts, and the ratio of the (A) and (B) components to be incorporated in the polymer, or in the polymeric material, to efficaciously endow it with self-extinguishing characteristics, vary as a function of the same polymer. In general, in order to reach a satisfactory self-extinguishment level, in the polymer the following amounts are used of the two components, expressed as percentages by weight relatively to the polymer endowed with self-extinguishing characteristics:

(A) isocyanuric acid hydroxyalkyl-derivative polymer: from 1 to 40%;

(B) ammonium polyphosphate: from 1% to 60%.

The flame-proofing composition according to the invention, when referred to the total of the same composition, is constituted by the following weight percentages of the two components:

(A) isocyanuric acid hydroxyalkyl-derivative polymer: from 10 to 90%;

(B) ammonium polyphosphate: from 90% to 10%.

The components (A) and (B) of said flame-retarding composition may be mixed with from 10 to 30% by weight of a wax, or of a polymeric substance of the same nature as, or any way compatible with, the polymer to which said flame-retarding composition is added, performing the function of a bonding-carrier agent, and/or with other additives, such as various coadjuvants, dyes, lubricants, and antistatic agents of known type.

The total amounts of the composition according to the invention to be incorporated in the polymeric materials are of the order of from 5 to 70% by weight (relatively to the total). For example, in polypropylene, approximately 20–40% thereof are incorporated; in polyethylene, 25–45% thereof, and in ABS resins 30–50% thereof are incorporated; thus, self-extinguishing materials of V-0 grade according to UL-94 (Underwriter Laboratories, U.S.A.) being obtained.

The flame-retarding composition according to the invention makes it possible to simultaneously use, in the polymer undergoing the self-extinguishment treatment, stabilizer-antioxidant agents of known type, lubricants, dyes, inorganic fillers, mineral fibres, and the like.

The constituents of the flame-proofing composition according to the invention are incorporated in the polymers according to known techniques, which may vary from case to case, as a function of the polymer. For instance, in case of a polyolefinic polymer, the incorporation can be carried out by melt-blending in the plastic state into screw extruders.

The present invention can be better evidenced and disclosed by the following examples of practical embodiment thereof, which are supplied for the purpose of merely illustrating and not limiting the scope of protection of the same invention.

EXAMPLE 1

On a mechanical mixer, a blend was prepared, consisting of 69.8% of polypropylene (MFI=12), 15% of tris-(2-hydroxyethyl)-isocyanurate polymer, "A" component according to the invention, 15% of "B" component—ammonium polyphosphate microencapsulated with epoxy resin (EXOLIT 455 by Hoechst)—and 0.2% of antioxidant (IRGANOX 1010).

The blend was subsequently mixed and melted to the plastic state into a screw extruder, and cylindrical granules of 3×3 mm were obtained, which were ready to be transformed into finished or semi-finished shaped articles by means of conventional fabrication procedures, e.g., injection-moulding, and extrusion. The so-obtained polypropylene (denominated as the "a" sample), was submitted to the tests for self-extinguishment, and to the mechanical tests for characterization, whose results are reported in Table 1.

On the same mechanical mixer, a blend was prepared, for comparison purposes, which was constituted by 69.8% of polypropylene, 15% of ammonium polyphosphate EXOLIT 455 and 0.2% of antioxidant, but using, instead of tris-(2-hydroxyethyl)-isocyanurate polymer, 7.5% of tris-(2-hydroxyethyl)-isocyanurate as such, in monomer form (soluble in water), and 7.5% of melamine cyanurate. From the so-prepared blend, on a screw extruder cylindrical granules were obtained, from which the samples (denominated "b" sample) were prepared, which were submitted to the self-extinguishment tests, and to the mechanical characterization tests, whose results are also shown in following Table 1. It can be seen that in both cases a satisfactory level of self-extinguishment was reached, but the mechanical characteristics of the "a" sample, obtained by using the flame-proofing composition according to the present invention, result definitely higher than of "b" sample, obtained according to the known techniques. Furthermore, the "b" sample loses its self-extinguishing characteristics when undergoing an extraction with boiling water. Furthermore, the "a" sample is nearly transparent, whilst the "b" sample is opaque. This indicates a better dispersion in the "a" sample of the flame-proofing additives throughout the polymeric matrix.

TABLE 1

| | "a" Sample | "b" Sample |
|---|---|---|
| COMPOSITION | | |
| Polypropylene (MFI = 12) | 69.8% | 69.8% |
| Microencapsulated ammonium polyphosphate (EXOLIT 455) | 15% | 15% |
| Tris-(2-hydroxyethyl)-isocyanurate polymer | 15% | — |
| Tris-(2-hydroxyethyl)-isocyanurate monomer | — | 7.5% |
| Melamine cyanurate | — | 7.5% |
| Antioxidant (IRGANOX 1010) | 0.2% | 0.2% |
| TEST RESULTS | | |
| Self-extinguishment (UL 94-V) | V-0 | V-0 |
| Self-extinguishment after extraction with boiling water | V-0 | burns |
| Appearance | translucent | opaque |
| Temperature resistance (VICAT)(ASTM D1525) | 103° C. | 81° C. |
| Elongation at break (ASTM D638) | 55% | 17% |
| Impact strength (IZOD without notch) (ASTM D256), kg cm/cm | 20 | 12 |

EXAMPLE 2

495 g of tris-(2-hydroxyethyl)-isocyanurate monomer were melted to 150° C. Slowly and under stirring, 5 g of toluensolphonic acid were added. Still under stirring, and maintaining the temperature at 150° C., 500 g of ammonium phosphate, commercial grade, were added slowly to the melted mass.

A viscous mass is so obtained, which is maintained at 190° C. for 5 h under vacuum. The composition (A+B) obtained is cooled at room temperature and then finely ground, at approximately 80 μm.

On a mechanical mixer a blend was prepared consisting of 69.8% of polypropylene (MFI=12), 30% of said composition (A+B) and 0.2% of antioxidant (IRGANOX 1010).

The blend was mixed and melted to the plastic state into a screw extruder, and cylindrical granules of 3×3 mm, as in the Example 1, were obtained. The so obtained polypropylene was submitted to the tests for self-extinguishment and to mechanical tests for characterization, whose results are the following:

| | |
|---|---|
| Self-extinguishment (UL 94-V) | V-0 |
| Self-extinguishment after extraction with boiling water | V-0 |
| Appearance | Translucent |
| Temperature reisistance (VICAT)(ASTM D1525) | 150° C. |
| Elongation at break (ASTM D638) | |
| Impact strength (IZOD without notch) (ASTM D256) | 25 Kg cm/cm |

EXAMPLE 3

A blend is prepared, which is constituted, in % by weight, by 60% of ABS resin, 15% of "A" component and 25% of "B" component, said blend being obtained and fabricated in granular form, by operating as in Example 1. Also this polymeric product (like that from Example 1, "a" sample), results to be self-extinguishing of V-0 grade (UL-94), both before and after the extraction with boiling water.

EXAMPLE 4

A blend is prepared, which is constituted, in % by weigh, by 60% of ABS resin, 40% of composition (A+B), prepared as in Example 2, wherein the ratio of the "A" component to the "B" component is equal to 1:1,7, said blend being obtained and fabricated in granular form, by operating as in Example 2.

Also this polymeric product results to be self-extinguishing of V-0 grade (UL-94), both before and after the extraction with boiling water.

EXAMPLE 5

A blend of polyol and toluenediisocyanate was prepared in the ratios normally used to obtain polyurethanes for foaming processes. To said blend, an amount of 20% by weight is added of the flame-proofing composition according to the invention, wherein the ratio of the "A" component, tris-(2-hydroxyethyl)-isocyanurate polymer, to the "B" component is equal to 1:5. The so-obtained product shows to be self-extinguishing of Class B1 according to DIN 4102, after the specimens of the material undergoing a hot-water extraction treatment.

EXAMPLE 6

To 100 parts by weight of a polyester resin dissolved in 30 parts of monomeric styrene, 60 parts by weight is added of a mixed flame-proofing composition according to the invention, wherein the ratio of the "A" component to the "B" component is equal to 3:2. The product, suitably crosslinked by means of known crosslinking agents, results to be self-extinguishing according to UL-94 V-0, and ASTM D229 (method 2).

EXAMPLE 7

To 100 parts of epoxy resin prepolymer, 45 parts by weight is added of a mixture constituted by 20 parts of "A" component, and 25 parts of "B" component. Said composition is then polymerized and set with catalysts according to the known processes, on the vertical press.

The so-obtained polymer results to be endowed with V-0 grade self-extinguishing properties according to UL-94 method.

EXAMPLE 8

A paint formulation having the following composition:

| | |
|---|---|
| Water | 30.6 parts by weight |
| "A" Component | 14.2 parts by weight |
| "B" Component | 24.2 parts by weight |
| Polyvinyl acetate (Emulsion at 60% of solids) | 20.0 parts by weight |
| Chloroparaffins | 3 parts by weight |
| TiO$_2$ | 6.0 parts by weight |
| Emulsifiers, surfactants | 2 parts by weight | was submitted to the combustion test. The paint resulted to be intumescent.

EXAMPLE 9

To 100 parts by weight of a chlorovinylic resin at 60% of dry matter, 20 parts by weight is added of a mixture constituted by 10 parts of "A" Component, and 15 parts of "B" Component.

The so-obtained emulsion was coated on the weft of an acrylic fabric. After drying, the fabric underwent the DIN 4102 test, and resulted to belong to B1 Class. Furthermore, according to the invention, in order to facilitate the metering (absence of dusts) and the dispersion of the flame-retarding composition in the polymeric materials to be endowed with self-extinguishing properties, said composition can be compounded and granulated with an amount of 10–30% of a wax, or of a polymeric substance compatible with the polymer to which it must be added, which performs the function of a bonding-carrier means for the flame-retarding components, as well as with other optional conventional additives, such as coadjuvants, dyes, lubricants, antistatic agents, inorganic fillers, and the like.

In this way, a "concentrate/supported composition" (known as a "masterbatch") of the above-said flame-retarding agent, ready to be added to the polymers, is formed.

To the invention, as hereinabove disclosed and illustrated, technically equivalent variants can be possibly supplied, all of them being within the protection of the same invention.

I claim:

1. A flame retardant composition for polymeric materials comprising a polymer derived from the polymerization of a hydroxyalkyl derivative of isocyanuric acid monomer and ammonium polyphosphate, said ammonium polyphosphate having the general formula $(NH_4)_{n+2}P_nO_{3n+1}$ wherein n is a number higher than 20;

said ammonium polyphosphate being uniformly and intimately incorporated into said polymer of said hydroxyalkyl derivative of isocyanuric acid; and said ammonium polyphosphate being mixed with the monomer of said hydroxyalkyl derivative of isocyanuric acid in the presence of a condensation-etherification catalyst before or while the polymerization of said monomer is carried out.

2. A flame retardant composition according to claim 1, wherein said hydroxyalkyl derivative of isocyanuric acid is tris-(2-hydroxyethyl)-isocyanurate.

3. A flame retardant composition according to claim 1, wherein said ammonium polyphosphate is ammonium polyphosphate having the general formula $(NH_4)_{n+2}P_nO_{3n+1}$, wherein n is a number from 1 to 20.

4. A flame retardant composition according to claim 1, wherein said flame retardant composition is constituted by 10 to 90% by weight of said polymer of said hydroxyalkyl derivative of isocyanuric acid and 90 to 10% by weight of said ammonium polyphosphate.

5. A flame retardant composition according to claim 1, wherein said composition is mixed with from 10 to 30% by weight of a wax, or of a polymeric substance; and the polymeric material to which said composition is added, performing the function of a bonding-carrier agent; and other additives are selected from the group consisting of a coadjuvant, a dye, a lubricant and an antistatic agent.

6. In a method for adding an agent to render polymers or copolymers self-extinguishing, the improvement comprising utilizing the flame retardant composition according to claim 1 as said agent, and wherein said polymers or copolymers are selected from the group consisting of polyethylene, polypropylene, ethylene-propylene rubbers, polystyrene, impact-resistant polystyrene, ABS resins, SBS resins, polyurethanes, epoxy resins, unsaturated polyesters, paints, sizes for fabrics, and latexes for carpets.

7. A polymeric material endowed with self-extinguishing properties comprising the flame-retardant composition according to claim 1.

* * * * *